(Model.)

J. C. COVERT.
TETHERING DEVICE.

No. 249,904.  Patented Nov. 22, 1881.

Witnesses,
Edwin L. Yewell
J. J. McCarthy

Inventor,
J. C. Covert.
per C. M. Alexander
Attorney.

United States Patent Office.

JAMES C. COVERT, OF WEST TROY, NEW YORK.

TETHERING DEVICE.

SPECIFICATION forming part of Letters Patent No. 249,904, dated November 22, 1881.

Application filed September 28, 1881. (Model.)

*To all whom it may concern:*

Be it known that I, JAMES C. COVERT, of West Troy, in the county of Albany, and in the State of New York, have invented certain new and useful Improvements in Tethering Devices; and I do hereby declare that the following is a a full, clear, and exact description thereof, reference being had to the accompanying drawings, and to the letters of reference marked thereon, making a part of this specification.

This invention relates to an improved picket-pin or animal-tether; and it has for its object to provide a device that can be conveniently transported from place to place by a horseman, and which can be readily and firmly secured in the ground, so as to secure the ropes or lariat by which the animal is held, and which will prevent the kinking or twisting of such rope or lariat from the motions of the animal, as more fully hereinafter specified. These objects I attain by the devices illustrated in the accompanying drawings, in which—

Figure 1:
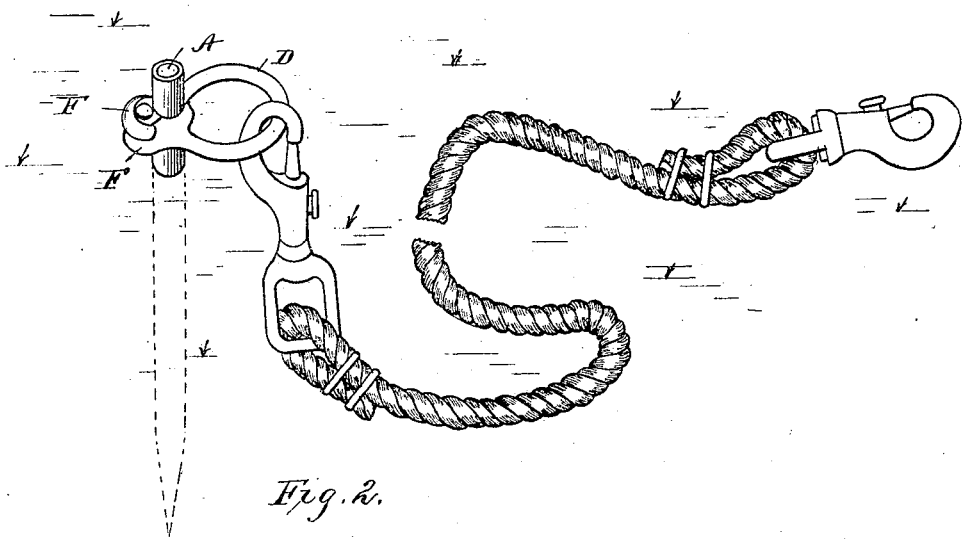
Figure 2:
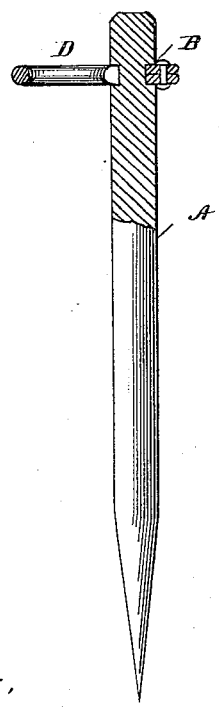
Figure 3:
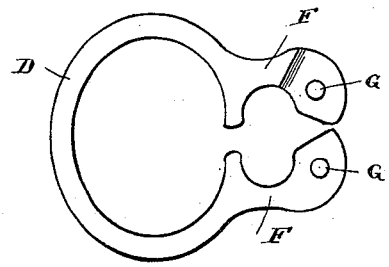

Figure 1 represents a perspective view of my invention, showing the picket inserted in the ground and the lariat attached thereto and the connections. Fig. 2 represents a sectional view of the picket detached from the lariat, and Fig. 3 a detached view of the swiveled connection forming part of the picket to which the lariat or rope is attached.

The letter A indicates the picket-pin, which is preferably constructed of metal of suitable or convenient size, and is pointed at one extremity, in order that it may be readily driven into the ground. The said pin, near its upper end, is provided with an annular groove or recess, B, for the reception of a connection, D, which is loosely connected or swiveled in said recess, as more fully hereinafter described. The said connection D is constructed of malleable metal, preferably of malleable cast-iron, in the form illustrated in Fig. 3 of the drawings, with two semicircular jaws, F, to clasp the grooved portion of the pin, and apertures G, for the rivet by which the parts are to be held together. The extremities of the said connection D is cut away on opposite sides, so that they will overlap each other, when brought together, without increasing the thickness of the connection at such overlapped ends. The connection is applied to the pin by placing the grooved portion between the curved parts of the jaws and pressing the jaws together by means of a suitable instrument, after which the ends are riveted together, as shown.

As thus constructed, it will be perceived that a cheap and neat connection for the pin is obtained, which can be readily applied, and which will not be liable to get out of order, and to which any description of snap-hooks or lariats may be attached, although I prefer to use the snap-hooks known to the trade as the "Covert swivel snap-hook."

It is evident that the pin can be driven into the ground close up to the connection, and, as there are no springs to get out of order, the device will be in nowise injured thereby. Moreover, when thus driven home in the ground, there is no leverage-strain on the ring, and the pin thus holds securely in the ground. The connection being formed of one solid piece of metal, when riveted around the pin it forms a perfect journal, which swivels readily, and prevents all possibility of the shrinking or tangling of the rope.

Having thus described my invention, what I claim, and desire to secure by Letters Patent, is—

1. A connection for securing the rope to a picket-pin consisting of a ring of malleable metal open at one side, and provided with curved jaws to embrace the annular groove in the pin, the jaws being adapted to be closed upon the pin, and the ring secured thereon by overlapping and securing its ends, substantially as specified.

2. In combination with a picket-pin, A, an attachment, D, provided with semicircular jaws F having overlapping ends adapted to be secured together to clamp the attachment to the pin, substantially as specified.

In testimony whereof I affix my signature in presence of two witnesses this 23d day of September, 1881.

JAMES C. COVERT.

Witnesses:
FRED. W. COVERT,
A. B. COVERT.